United States Patent
Bacigalupo

[19]

[11] Patent Number: 6,167,478
[45] Date of Patent: Dec. 26, 2000

[54] PIPELINED ARBITRATION SYSTEM AND METHOD

[75] Inventor: Tommaso Bacigalupo, San Jose, Calif.

[73] Assignee: Infineon Technologies North America Corp.

[21] Appl. No.: 09/167,652

[22] Filed: Oct. 5, 1998

[51] Int. Cl.[7] .................................................. G06F 12/00
[52] U.S. Cl. ........................ 710/240; 710/111; 710/244
[58] Field of Search .................................. 710/200, 240, 710/244, 111, 113, 114, 116, 118, 220, 241, 242, 243, 128, 126, 129, 125, 123, 121, 120, 119, 264, 40

[56] References Cited

U.S. PATENT DOCUMENTS

| | | | |
|---|---|---|---|
| 5,101,482 | 3/1992 | Kipnis ..................................... | 710/118 |
| 5,303,382 | 4/1994 | Buch et al. ............................. | 395/725 |
| 5,617,575 | 4/1997 | Sakakibara et al. ...................... | 712/34 |
| 5,640,585 | 6/1997 | Smoot, III et al. ..................... | 395/800 |
| 5,680,594 | 10/1997 | Charneski et al. ...................... | 395/556 |
| 5,748,969 | 5/1998 | Lee et al. ................................. | 710/113 |
| 5,931,924 | 8/1999 | Arimilli et al. .......................... | 710/116 |
| 5,935,234 | 8/1999 | Arimilli et al. .......................... | 710/116 |

*Primary Examiner*—Glenn A. Auve
*Assistant Examiner*—X. Chung-Trans

[57] ABSTRACT

An access control system (10) for controlling access to a shared resource among a plurality of service requestors is described. When a service requestor seeks access to the shared resource, it generates a service request signal which includes its assigned unique service request priority number. The outputs of all the service requesters are applied to pipelined first and second OR-trees (75, 78) which produce an OR-ed output signal. The OR-ed output signal is then applied to an access control unit (38) which performs an arbitration protocol to determine the highest priority number. Each service requester includes a state machine which selectively applies the bits of its priority number to the OR-trees (75, 78). The use of pipelined protocol with two OR-trees (75, 78) reduces cycle consumption and permits arbitration within a single clock cycle.

20 Claims, 3 Drawing Sheets

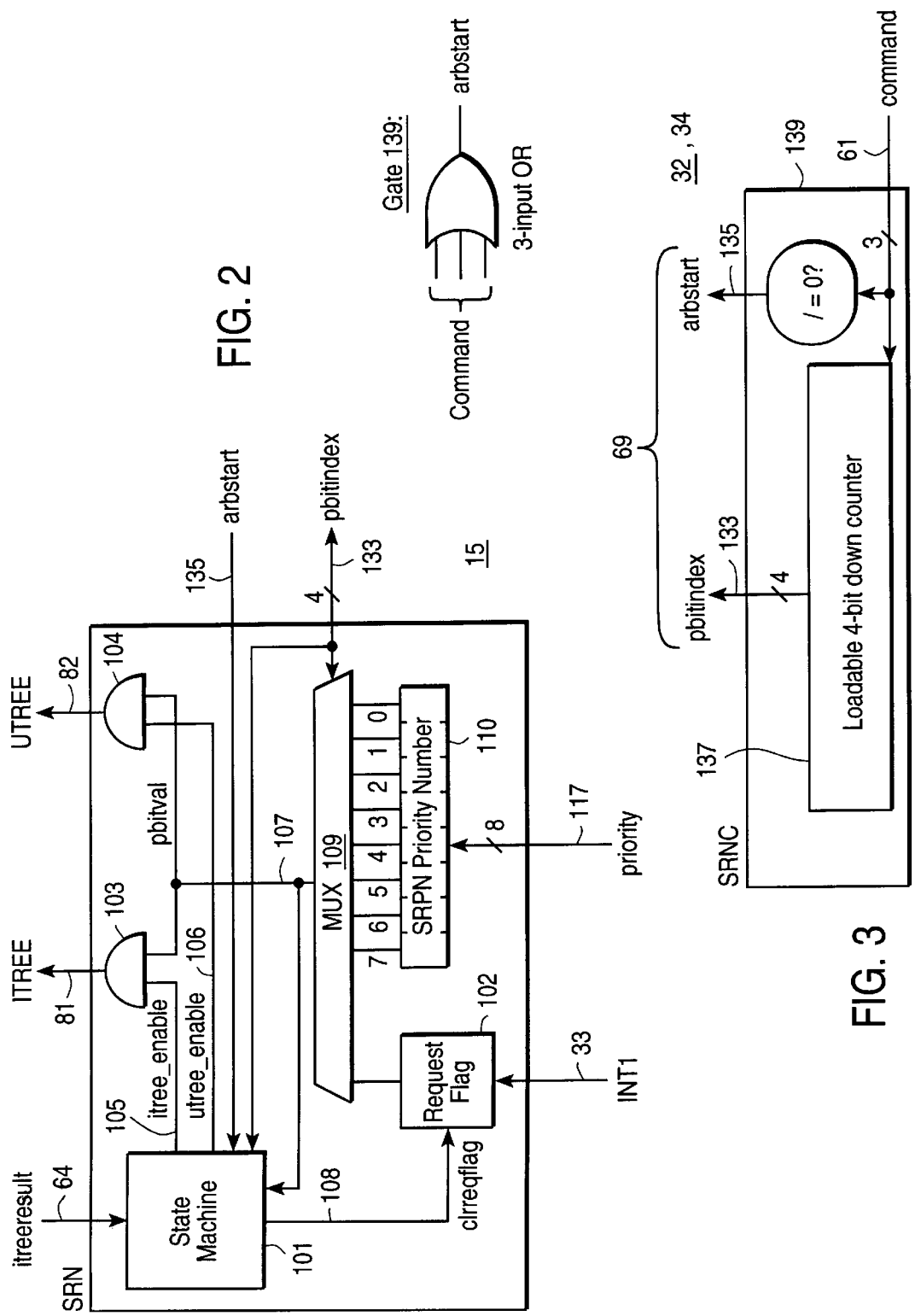

PIPELINED ARBITRATION SYSTEM AND METHOD

BACKGROUND OF THE INVENTION

1. Field of the Invention

This invention relates generally to a system and method for arbitrating access to a shared resource among multiple requesters, and more particularly to a system and method which determines the requestor with the highest priority.

2. Description of the Related Art

Many systems must manage access of peripheral devices to a shared resource. One common approach to manage the resource conflict is to prioritize the requests and to give the resource to the requestor with the highest priority number. In a computer system, for example, peripherals generally obtain access to the central processor through an interrupt system.

There are many ways to determine which requester has the highest priority. A common technique is a round robin scheme in which the arbiter checks the priority number of each requestor sequentially. While straightforward, the round robin technique requires several clock cycles for each bit of the priority number to complete in systems with many requestors. Other algorithms which are faster than the round robin technique have been used. Some require implementation using a dynamic wired-or function. However, new semi-custom techniques, such as logic synthesis, do not easily allow inclusion of dynamic logic, e.g., precharge-discharge logic.

There is a need for an arbitration system which can be implemented with static logic or a simple OR-tree. There is also a need for an arbitration system which can determine the requester with the highest priority using a single clock cycle for each bit of the priority number. There is a need for an arbitration system which is flexible enough to enable an expanded protocol.

SUMMARY OF THE INVENTION

To achieve the foregoing and other advantages, an access control system for controlling access to a shared resource according to the invention includes a plurality of service request nodes (SRNs), first and second OR-trees and an interrupt control unit (ICU). Each SRN is assigned a unique priority number, which is programmed by the user. Essentially, the access control system determines interrupt priority by performing a bit-by-bit comparison between the SRN priority numbers. To accomplish this comparison, outputs from each SRN, which can represent bits of the priority number, are OR-ed in the first and second OR-trees and the result is propagated to the ICU. The ICU performs an arbitration round which determines which of the requesting SRNs has the highest priority. The ICU then generates an interrupt request signal which includes the priority number of the winning SRN and presents it to the shared resource. The ICU maintains the priority number of the current SRN having access to the shared resource to ensure that only an SRN with a higher priority number can bump an SRN currently accessing the shared resource.

The access control system utilizes a pipelined protocol, which is made possible by the two OR-tree arrangement. The pipelined protocol significantly reduces arbitration time.

The arbitration according to the invention can be used for any kind of arbitration, including interrupt arbitration, direct memory access (DMA) and multi-master management. The system uses OR-trees, but dynamic wired OR-functions or other wired-OR implementations may also be used.

Each SRN may include a state machine which selectively applies the bits of the priority number to the first and second OR-trees. The system includes one or more service request node counters (SRNCs) which provide down count signals to the SRNs for synchronizing selection of the priority number bits during an arbitration round.

Many advantages are achieved with the invention, which includes a pipelined protocol that reduces interrupt arbitration time. Additionally, space savings are achieved in that the wires used for arbitration are also used for passing additional information after the arbitration.

BRIEF DESCRIPTION OF THE DRAWINGS

FIG. 2 is a block diagram of a service request node according to an embodiment of the present invention.

FIG. 3 is a block diagram of a service request node counter according to an embodiment of the present invention.

DETAILED DESCRIPTION OF THE INVENTION

Figure 1:
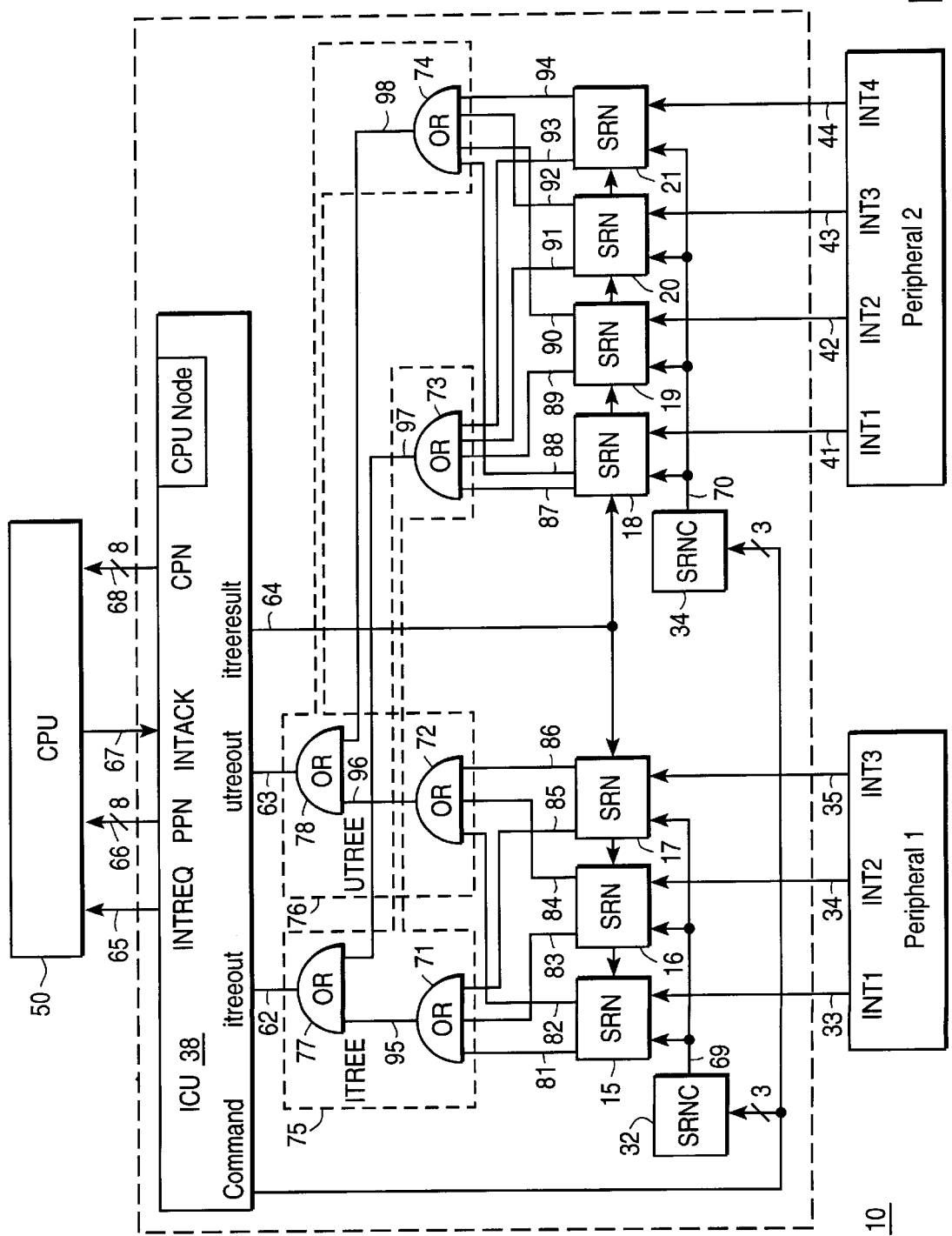
FIG. 1 is a block diagram of a pipelined arbitration system according to an embodiment of the present invention.

By way of example, a block diagram of an access control system 10 according to the present invention is shown in FIG. 1. The access control system 10 arbitrates access of any number of peripherals 30, 40 to a shared resource 50, such as a central processing unit (CPU) or direct memory access (DMA) controller, or the like. The peripheral 30 may include three segments which can assert requests for access independently via a plurality of interrupts 33, 34 and 35. Similarly, the peripheral 40 may include four segments which can assert requests for access independently via a plurality of interrupts 41, 42, 43 and 44.

Each interrupt request output (INT1, INT2, etc.) of the peripherals 30, 40 may be applied to the inputs of a plurality of service request nodes (SRNs). As shown, the interrupts 33, 34 and 35 from the peripheral 30 may be applied to the inputs of SRNs 15, 16 and 17, respectively. Similarly, the interrupts 41, 42, 43 and 44 of the peripheral 40 may be applied to the inputs of SRNs 18, 19, 20 and 21, respectively. Each SRN has a programmable service request priority number, which uniquely defines its respective interrupt priority. Each priority number can be stored within a corresponding SRN, in a register 110 (FIG. 2).

A plurality of service request node counters (SRNCs) 32 and 34 count down so that the bits in the priority number can be accessed and arbitrated on a bit-by-bit basis, with the most significant bit being arbitrated first. For each arbitration round, the arbitration continues for each bit in the priority number. The SRNCs 32 and 34 are shown as driving the groups of SRNs 15–21, but could be configured to drive individual SRNs. However, since each peripheral 30–40 normally has more than one SRN 15–21, it is convenient to have one common counter for each peripheral 30, 40.

The outputs of the SRNs 15–21 may be applied to two OR-trees, ITREE 75 and UTREE 76. The dual OR-tree arrangement permits the interrupts to be arbitrated in a pipelined manner, as discussed below in detail. The OR-trees 75–76 perform a wired-OR function of all SRN 15–21 outputs. The delay times through the OR-trees 75,76 can be reduced by building balanced trees with multiple input OR-gates, which may be optimized according to the clustering of the SRNs 15–21.

The ITREE 75 includes three inputs from the OR-gates 71,73,77. Similarly, the UTREE 76 receives three inputs from the OR-gates 72,74,78. As shown, the outputs 81–94 from the SRNs 15–21 are applied to the OR-gates 71–74. Depending on the number of SRNs 15–21 included in the access control system, a different number of inputs for the OR-gates 71–74 may be required. The outputs of the two OR-trees 75–76 are provided to the ICU 38 as the signals ITREEOUT and UTREEOUT.

Based on the OR-ed results from the OR-trees 75–76, the interrupt control unit (ICU) 38 can monitor and control the arbitration round to determine the SRN with the highest priority number, among those SRNs requesting an interrupt.

Referring to FIG. 2, a block diagram of an SRN 15–21 is shown. The SRN 15–21 may include a state machine 101, an ITREE AND-gate 103, an UTREE AND-gate 104, a multiplexer 109 and the register 110 for storing the priority number, and a register 102 for storing an interrupt request flag. When the peripheral 30 (FIG. 1) requests access to the shared resource 50, it sends an interrupt signal (INT1–INT3) 33–35 to an SRN 15–17. The interrupt signal sets the request flag to "1" in the register 102.

As shown in FIG. 3, the SRNCs 32, 34, may include a loadable down counter 137 (shown as a 4-bit down counter) and an OR-gate 139. The down counter 137 can be a synchronous counter that decrements its output in response to a clock signal (not shown). The signal lines 69 and 70 from the SRNCs 32, 34 carry an arbitration start signal, ARBSTART 135, and a priority bit index signal, PBITINDEX 133, which are applied to the SRNs 15–21. As shown, the signal PBITINDEX is a 4-bit value applied to the MUX 109 as a select signal to identify the specific bit being arbitrated. The specific bit being arbitrated is selected from one of the eight bits contained in register 110 or the bit stored in the request flag register 102. In the example shown, when the most significant (MSB) bit of PBITINDEX is equal to "1", the request flag register 102 is selected. Otherwise, the lower three bits of PBITINDEX indicate one of the eight bits stored in register 110.

The ARBSTART 135 signal is generated by the OR-gate 139 in response to the command signal 61. Accordingly, the ARBSTART signal 135 is asserted anytime the command signal 61 is greater than zero. The ARBSTART signal 135 indicates that an arbitration round is commencing.

The arbitration round, controlled by the ICU 38, is used to determine the highest priority number of all SRNs 15–21 requesting access to the shared resource 50. The ICU 38 begins an arbitration round by sending a command signal (COMMAND) via line 61 to the SRNC counters 32 and 34. The command signal can be a three-bit value, indicating the length of the priority number stored in the register 110 (FIG. 2). The ICU 38 can store information about arbitration length and the length of the priority number. Upon receipt of the command signal on line 61, the SRNC 32, for example, begins its down count cycle by sending a signal 69 to the SRNs 15–17. Similarly, the SRNC 34 begins its down count cycle by sending a signal 70 to the SRNs 18–21.

When the command signal 61 is "111" to "001" (7 to 1 decimal), the down counter 137 is loaded with the corresponding value and ARBSTART signal 135 is activated. When the command signal 61 is "000" (0 decimal), the down counter 137 counts down (provides PBITINDEX signal 133) until "1111" (−1 decimal) is reached. The contents of the request flag register 102 can be accessed when output "1111" is provided to the MUX 109.

In this example, the minimum arbitration length in the command signal 61 may be "001", so that the two least significant bits of the register 110 are output during an arbitration round. Since the two least significant bits can represent four possible values, i.e., "00", "01", "10", or "11". The minimum arbitration length of "001" can select a winning priority number from among a maximum of four SRNs participating in a given arbitration round.

During an arbitration round, priority bit selection is controlled by the output PBITINDEX 133 of the SRNCs 32, 34; which, in turn, controls the multiplexer 109 to sequentially provide the value of each bit of the priority number to the inputs of the AND-gates 103–104. During an arbitration round, the state machine 101 receives as inputs the signals ARBSTART 135 and ITREERESULT 64 from the ICU 38. Depending on the output of the state machine 101, the bits of the priority number will be passed to either ITREE 75 or UTREE 76 via the AND-gate 103 and the AND-gate 104, respectively. The ICU 38 sets ITREERESULT 64 once for each priority bit arbitrated. The ITREERESULT 64 is set to equal either the ITREEOUT 62 or the UTREEOUT 63. The ITREERESULT is set to the UTREEOUT when all participating SRNs are in an "uncertain" state, which is described below.

At the end of the arbitration round, the ICU 38 compares the priority number of the winning SRN to the priority number of an SRN currently accessing the shared resource 50, should there be one. If the winning priority number is higher than the current priority number (CPN), the ICU 38 assets an interrupt request signal 65 (INTREQ). The shared resource 50 provides the CPN to the ICU 38 via line 68. This prevents an interrupt with a lower priority from disturbing a higher priority service. In addition, the priority number of the winning SRN is provided to the shared resource 50 as a pending priority number (PPN) via line 66. The shared resource 50 can send an acknowledgement of the received interrupt and PPN via line 67, as signal INTACK.

During each clock cycle, the SRNCs 32, 34 decrement their outputs, the multiplexers 109 in each SRN 15–21 provide the next priority bit to the AND-gates 103–104, and, depending on the current state of the state machine 101, the priority bits pass through the AND-gates 103, 104 and are combined in the OR-trees 75–76.

For purposes of illustration, an arbitration toward using a single OR-tree is described. Interrupt arbitration using a single OR-tree is similar to a successive approximation algorithm. In a synchronous system, where state transitions occur according to a clock signal, the successive approximation algorithm can require two clock cycles for each bit of the priority number. The algorithm works as follows: In the first clock cycle, every SRN which has a pending interrupt request drives the most significant bit of its priority number onto the OR-tree. In the second clock cycle, the OR-ed result is (ITREERESULT) fed back to the SRNs. The SRNs then decide whether they participate in the further arbitration or give up because they have no chance to win highest priority. Each SRN makes this decision based on the following conditions: If the SRN produced a priority bit of "1" during the first cycle and ITREERESULT is also "1", then the SRN participates in the second cycle. If the SRN produced a priority bit of "0" and ITREERESULT is also "0", the SRN participates in the second cycle. If the SRN outputs a priority bit of "0" and the OR-ed result is "1", the SRN gives up and ceases to participate in the arbitration round.

To complete the arbitration round, the two cycles are repeated for each next less significant bit until the least significant bit is reached. Because each SRN has a unique priority number, at the end of the arbitration round only one SRN is left to participate in the second cycle; it is the winner of the arbitration round.

As applied to a single OR-tree, synchronous arbitration system, the successive approximation technique consumes two clock cycles per priority bit and is an improvement over the round robin technique of the prior art. However, in the dual OR-tree system, arbitration for each bit in the priority number can be completed within one clock cycle. This is possible because SRNs outputting a priority bit of "1" automatically participate in subsequent bit arbitrations, while SRNs outputting a "0" are not certain to participate in the next bit arbitration.

The SRNs in the "uncertain" state use a different OR-tree (UTREE 76) than the SRNs outputting a "1" (ITREE 75), as described in more detail below. This permits the bit arbitration period to be reduced to one clock cycle.

Figure 4:
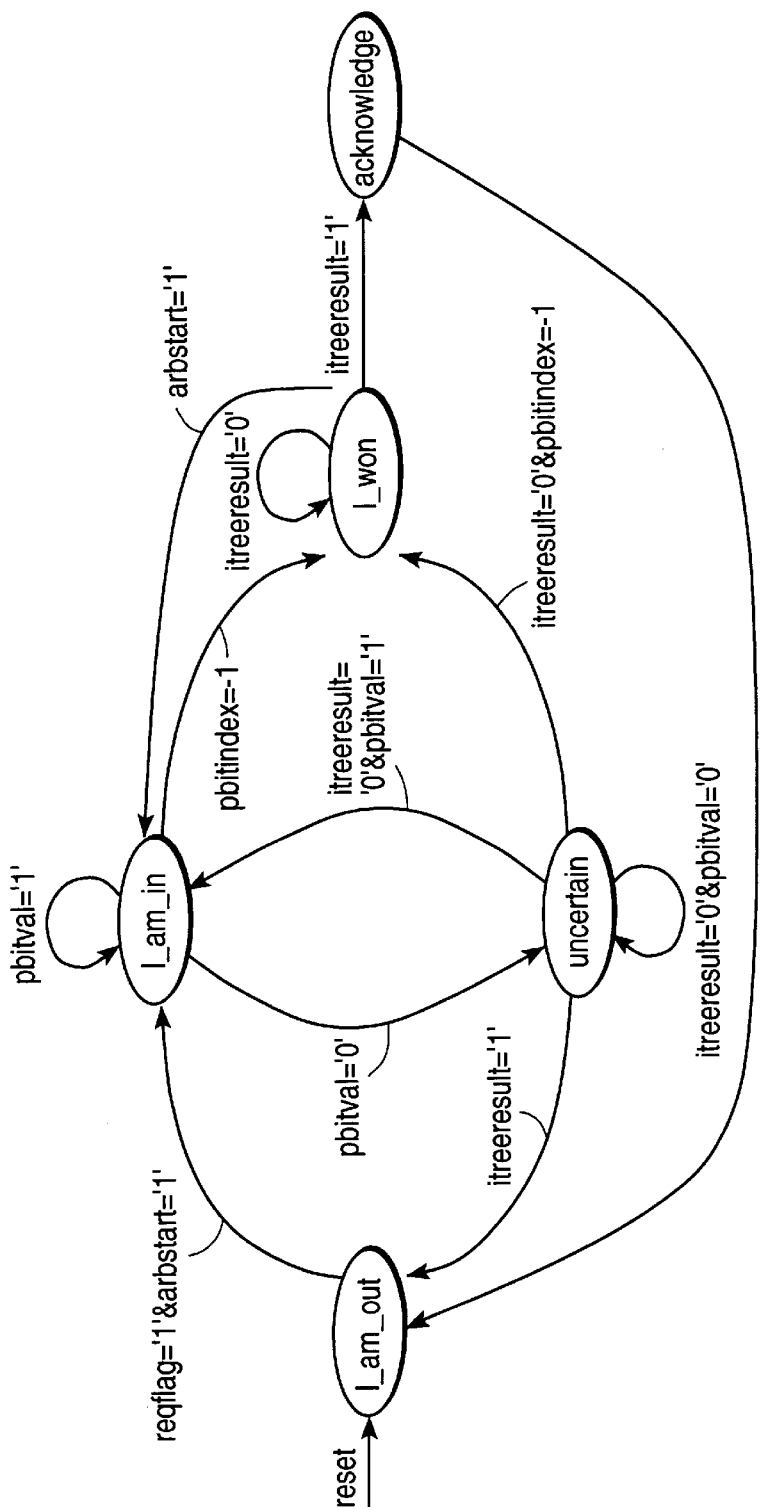
FIG. 4 is a tree diagram of a state machine for use in the service request node of FIG. 2.

FIG. 4 is a state diagram which shows the states and actions for the state machine 101. The state machine 101 can be a synchronous machine that transitions between states on the occurrence of a clock edge. The state machine 101 has five states: "I_am_in", "I_am_out, "I_won", "uncertain" and "acknowledge". On power-up, the state machine is initialized into the "I_am_out" state. The arbitration round begins when ARBSTART 135="1" and REQFLAG 102="1"; upon this occurrence, the state machine 101 enters the "I_am_in" state. In this state, if the priority bit being arbitrated (PBITVAL) is "1", the state machine 101 stays in the "I_am_in" state. When the state machine 101 is in the "I_am_in" state, it sets the ITREE_ENABLE 105 to "1"; allowing PBITVAL to propagate through AND-gate 103. In this state, the machine 101 also sets UTREE_ENABLE 106 to "0" to disable AND-gate 104.

If an end of count is detected (PBITINDEX=-1), the state machine transitions to the "I_won" state, indicating that the SNR include the state machine 101 has won the arbitration round. In PBITVAL="0"; the state machine 101 transitions from the "I_am_in" state to the "uncertain" state. In the "uncertain" state, the state machine 101 sets ITREE_ENABLE 105 to "0" to disable AND-gate 103 and UTREE_ENABLE 106 to "1" to allow PBITVAL to propagate through AND-gate 104.

The OR-ed results from both OR-trees are provided to the ICU 38, which then returns results of the first bit to all the SRNs via ITREERESULT 64, which contains "OR"-ed bits from ITREE or UTREE if all SRNs are in the "luncertain" state.

When processing the next priority bit, if PBITVAL="1", the state machine 101 stays in the "I_am_in" state, regardless of the value of ITREERESULT. If PBITVAL="0", the state machine 101 transitions to the "uncertain" state, regardless of the value of ITREERESULT. If the state machine 101 is already in the "uncertain" state and ITREERESULT="0" and PBITVAL="1", then the state machine 101 transitions to the "I_am_in" state. If the state machine 101 is in the "uncertain" state and ITREERESULT="1", then it transitions to the "I_am_out" state and ceases to participate further in the arbitration round. If the end of the countdown occurs (PBITINDEX=-1) and ITREERESULT is "0", the state machine 101 transitions to the "I_won" state.

Upon returning to the "I_am_out" state, the machine 101 sets ITREE_ENABLE 105 and UTREE_ENABLE 106 to "0", so as not to disturb the on-going arbitration round. However, if PBITINDEX=-1, arbitration has finished. If a new interrupt request occurs and the SRN did not take part in the current on-going arbitration round, then the state machine 101 sets UTREE_ENABLE 106 to "1", permitting REQFLAG to propagate to UTREE 76; otherwise, it sets UTREE_ENABLE 106 to "0".

If the state machine 101 is in the "uncertain" state and ITREERESULT="0" and PBITVAL="0", the state machine 101 stays in the "uncertain" state.

At the end of the countdown (PBITINDEX=-1), if the state machine 101 is in the "I_am_in" state at this time, the state machine 101 transitions to the "I_won" state. If ITREERESULT is "0", the state machine 101 stays in the "I_won" state until the ICU 38 acknowledges the arbitration round. The ICU acknowledges the completion of the arbitration round by asserting "1" on ITREERESULT. When in the "I_won" state, the state machine 101 sets ITREE_ENABLE 105 to "0" and UTREE_ENABLE 106 to "0". This disables the AND-gates 103, 104 so they do not disturb any new arbitration requests. In the "I_won" state, when ITREERESULT is "1", the state machine transitions to the "acknowledge" state and clears the request flag 102 (CLRREQFLAG="1"). The state machine can remain in the "acknowledge" state for one-clock period before transitioning to the "I_am_out" state.

After the arbitration round, one SRN will be in the "I_won" state, but it will generally take some time before the shared resource 50 enters the corresponding interrupt service routine. This event is signalled to the winning SRN by setting ITREERESULT to="1", which causes the winning SRN to enter the "acknowledge" state and to clear its interrupt request flag 102.

If no SRN has an interrupt request pending, it is not necessary to perform arbitration rounds, so the access control system can be shut down or put in a sleep mode to save power.

After completion of an arbitration, it can take time until the interrupt request is acknowledged by the shared resource 50. In the meantime, there could be a new higher priority interrupt request, which was not considered in the last arbitration round. It may be advantageous to signal to the shared resource 50 that a new interrupt occurred, which did not participate in the last arbitration round. Therefore, at the end of an arbitration round, each SRN drives its request flag to the ITREE 75, permitting the ICU 38 to determine whether a new interrupt has arrived.

What is claimed is:

1. A system for controlling access to a shared resource comprising:

a plurality of service request nodes, wherein each service request node is assigned a unique service request priority number, and when access to the shared resource is sought, generate request signals;

first and second OR-trees responsive to said request signals for generating first and second OR-ed output signals, said first and second OR-trees adapted to receive a request signal input from a plurality of said service request nodes; and an access control unit responsive to said first and second OR-ed output signals for performing an arbitration to determine the highest priority number and for generating an access request signal to said shared resource.

2. The system of claim 1 wherein said unique service request priority number comprises a predetermined number of bits and wherein each service request node comprises a state machine for selectively applying the bits of said unique service request priority number to said first and second OR-trees.

3. The system of claim 1 wherein said unique service request priority number comprises a predetermined number of bits, the system further comprising a service request counter for providing a count signal to said service request nodes for synchronizing selection of said bits during said arbitration.

4. The system of claim 2 wherein, during an arbitration, the state machine switches the bits of the unique service request priority number to one of two possible outputs, one of the possible outputs is applied to the first OR-tree and the second possible output is applied to the second OR-tree.

5. The system of claim 1 wherein the first and second OR-trees comprise wired OR-trees.

6. The system of claim 1 further comprising a service request counter coupled to said service request nodes, said service request counter comprising:
   a loadable down counter for counting down from the predetermined number of bits to −1.

7. A system for controlling access to a shared resource comprising:
   a plurality of service request nodes, wherein each service request node is assigned a unique service request priority number, and when access to the shared resource is sought, generate request signals;
   first and second OR-trees responsive to said request signals for generating first and second OR-ed output signals;
   an access control unit responsive to said first and second OR-ed output signals for performing an arbitration to determine the highest priority number and for generating an access request signal to said shared resource;
   a service request counter coupled to said service request nodes, said service request counter comprising a loadable down counter for counting down from the predetermined number of bits to −1;
   wherein each service request node's unique priority number comprises a predetermined number of bits and wherein each service request node comprises:
      an ITREE AND-gate;
      an UTREE AND-gate;
      a multiplexer for applying bits of said predetermined number of bits to said ITREE AND-gate and said UTREE AND-gate; and
      a state machine responsive to said service request counter and said access control unit for selectively enabling the bits of said priority number to said ITREE gate and said UTREE gate.

8. The system of claim 1 wherein said first and second OR-trees each comprise a predetermined number of OR-gates connected in parallel.

9. The system of claim 7 wherein, during an arbitration, each state machine switches the bits of an associated priority number to one of two possible outputs, the first possible output is applied to the ITREE OR-tree and the second possible output is applied to the UTREE OR-tree.

10. In a system having multiple requestors requesting a shared resource, wherein each requestor is assigned a unique service request priority number, a method of arbitrating access to the shared resource, comprising the steps of:
   generating a plurality of service request signals;
   combining the service request signals in first and second OR-trees to produce an OR-ed result; each of said first and second OR-trees adapted to receive a plurality of service request signals;
   performing an arbitration protocol on the OR-ed result to determine the requestor with the highest priority number; and
   issuing an access request signal to the shared resource.

11. The method of claim 10 wherein said unique service request priority number comprises a predetermined number of bits and further comprising the step of, for each service requestor, selectively applying the bits of said service requestor's unique priority number to said first and second OR-trees.

12. The method of claim 11 further comprising the step of providing a count signal to said service requestors for synchronizing selection of said priority number bits during said arbitration protocol.

13. The method of claim 11 wherein, during said arbitration protocol performing step, switching the bits of each service request priority number to one of two possible outputs, applying one of the possible outputs to the first OR-tree and applying the second possible output to the second OR-tree.

14. The method of claim 11 further comprising the step of counting down from the predetermined number of bits to −1.

15. In a system having multiple requesters requesting a shared resource, wherein each requestor is assigned a unique service request priority number, a method of arbitrating access to the shared resource, comprising the steps of:
   generating a plurality of service request signals,;
   combining the service request signals in first and second OR-trees to produce an OR-ed result;
   performing an arbitration protocol on the OR-ed result to determine the requestor with the highest priority number; and
   issuing an access request signal to the shared resource;
   wherein said unique service request priority number comprises a predetermined number of bits and further comprising the step of, for each service requester, selectively applying the bits of said service requestor's unique priority number to said first and second OR-trees;
   wherein each service request comprises an ITREE AND-gate and an UTREE AND-gate, and wherein said generating step comprises:
      applying the bits of said priority number to said ITREE gate and said UTREE gate; and
      responsive to said count signal, selectively enabling the bits of said priority number to said ITREE and said UTREE.

16. A system for controlling access to a shared resource, comprising:
   means for receiving a plurality of access requests from a plurality of peripherals, each of said requests having a predetermined priority number assigned thereto; and
   means for arbitrating between said plurality of access requests, said arbitrating means including means for performing an arbitration for one bit of each of said priority numbers per clock cycle, said arbitrating means including a plurality of OR-trees, each of said plurality of OR-trees having inputs related to a plurality of access requests.

17. A system according to claim 16, said arbitrating means including first and second OR-trees.

18. A system according to claim 17, said arbitrating means including a means for selectively applying bits of said priority number to said first and second OR-trees.

19. A system according to claim 18, said arbitrating means including means for providing a count signal for synchronizing selection of said bits during an arbitration.

20. A system according to claim 19, wherein said applying means applies the bits to either said first OR-tree or said second OR-tree.

* * * * *